July 22, 1969  G. E. BEYER ET AL  3,456,572
VEHICLE PANEL ASSEMBLY
Filed Dec. 18, 1967
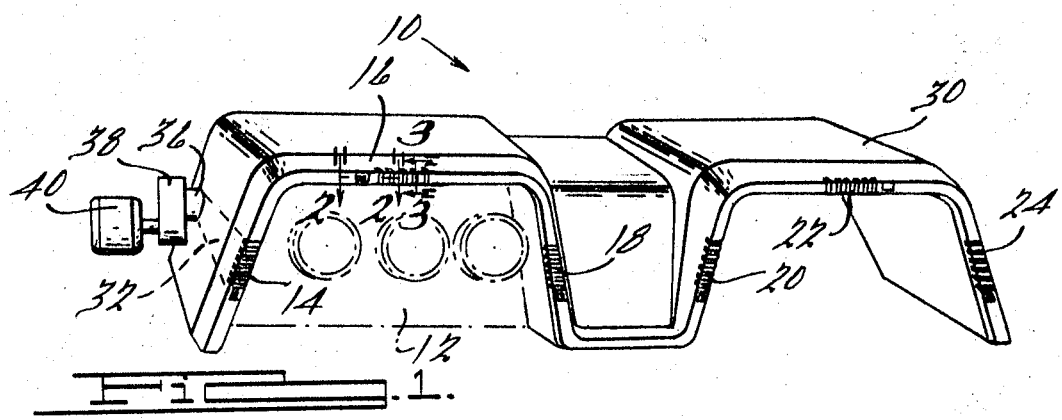
FIG. 1.
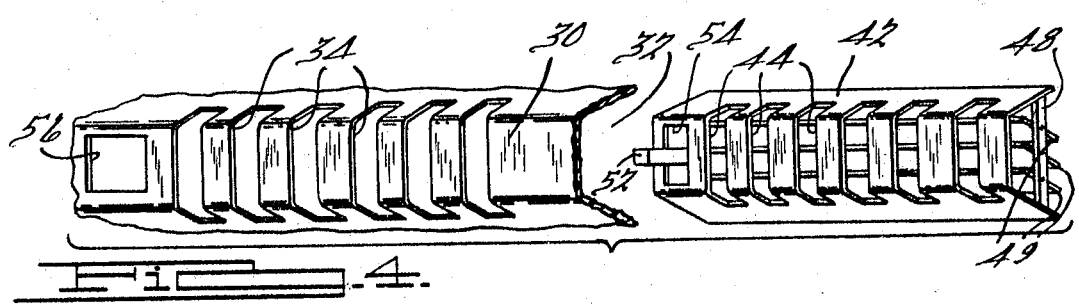
FIG. 4.
FIG. 2.
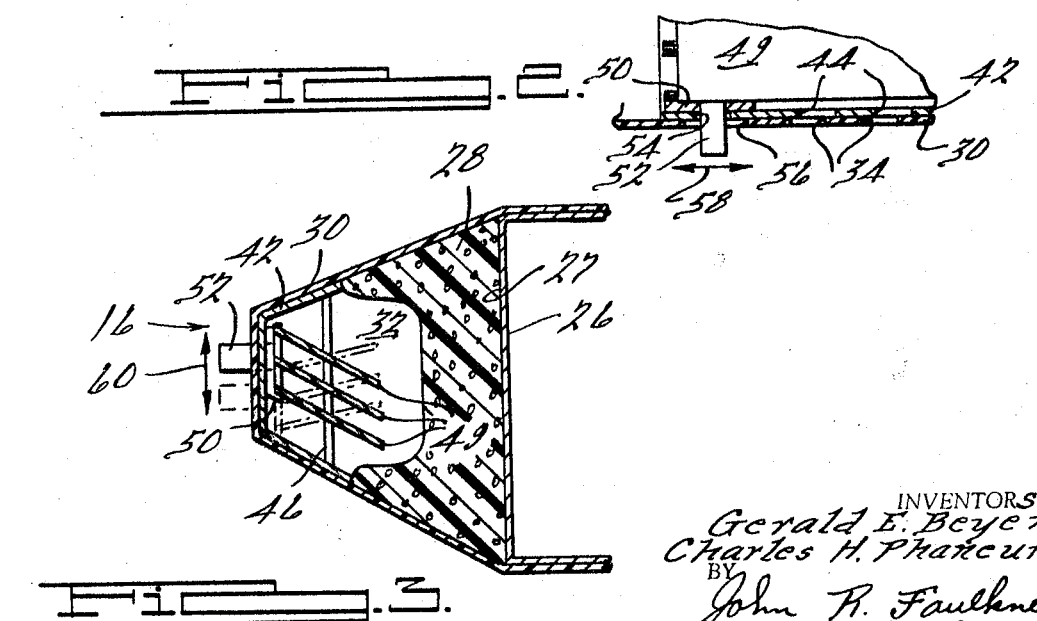
FIG. 3.
INVENTORS.
Gerald E. Beyer
Charles H. Pharcuf
BY
John R. Faulkner
C. Dennis O'Connor
ATTORNEYS.

3,456,572
VEHICLE PANEL ASSEMBLY
Gerald E. Beyer, Lathrup Village, and Charles H. Phaneuf, Birmingham, Mich., assignors to Ford Motor Company, Dearborn, Mich., a corporation of Delaware
Filed Dec. 18, 1967, Ser. No. 691,408
Int. Cl. B60h 1/26; B62d 25/14
U.S. Cl. 98—2    5 Claims

ABSTRACT OF THE DISCLOSURE

A motor vehicle panel assembly partially defining the vehicle passenger compartment and including a structural panel having a surface facing the passenger compartment and covered with energy absorbing padding. A decorative outer covering overlies the padding and is spaced therefrom to define, in cooperation with the padding, a conduit for the distribution of air from the vehicle climate control system to the passenger compartment. A plurality of apertures are formed through the outer covering to allow air flow from the conduit to the passenger compartment.

Background of the invention

Conventionally, heated and cooled air from a motor vehicle climate control system has been directed to, and distributed within, the vehicle passenger compartment by a system of air ducts. Such ducts have been positioned in the space between the vehicle firewall and instrument panel and have had outlet orifices directed at the floor of the passenger compartment and/or through apertures formed in the instrument panel. Packaging considerations necessarily have limited the number of such ducts and, consequently, the number of air discharge locations. This situation has led to hot and cold spots being present within the passenger compartment during heating and cooling operations by the climate control system. Also, vehicle interior crashworthiness design standards have led to the positioning of the dash panel as far forward as possible, thereby lessening the space between this panel and the firewall and consequently reducing the space available for the routing of air ducts.

It is an object of our invention to provide a motor vehicle dashpanel assembly including an air conduit through which air from the vehicle climate control system may be distributed to the vehicle passenger compartment. Any number of air discharge orifices may be provided from the dashpanel assembly air conduit to the passenger compartment to minimize temperature variations within this compartment. The dashpanel assembly of this invention has satisfactory energy absorbing characteristics and eliminates the necessity for extensive duct work to distribute air within the vehicle interior.

Summary of the invention

A dashpanel assembly constructed in accordance with this invention is adapted to define in part a motor vehicle passenger compartment and includes an elongated rigid panel. Resilient crash padding extends over at least a portion of the surface of this panel proximate the passenger compartment. A decorative outer covering overlies the surface of the padding remote from the panel and is spaced from the padding so that the padding and covering cooperate to define an air conduit therebetween extending along the panel assembly. The air conduit is in communication with a source of pressurized air such as the fan of the motor vehicle climate control system. The covering has at least one aperture formed therethrough permitting air flow from the conduit to the passenger compartment. Valve means, positioned within the conduit, are provided to regulate the volume and direction of air flowing through the aperture to the passenger compartment.

Description of the drawing

FIGURE 1 is an isometric view taken from the passenger compartment of a motor vehicle illustrating a vehicle dashpanel constructed in accordance with this invention and including a schematic representation of air pressurizing means associated with this assembly;

FIGURE 2 is a partial sectional view taken along the line 2—2 of FIGURE 1;

FIGURE 3 is a partial sectional view taken along the line 3—3 of FIGURE 1; and

FIGURE 4 is an exploded view of a portion of a dashpanel assembly of this invention illustrating the air flow control means included in the assembly.

Detailed description of the invention

Referring now in detail to the drawings, the numeral 10 denotes generally a motor vehicle dashpanel assembly constructed in accordance with this invention. It may be seen that assembly 10 is associated with an instrument panel 12 that may or may not be integrally formed with assembly 10 as will be explained in detail below. Positioned along the length of panel assembly 10 are a plurality of air outlet positions 14, 16, 18, 20, 22 and 24 at which positions air from the motor vehicle climate control system is discharged into the vehicle passenger compartment. Panel construction at these plurality of air discharge positions is identical and best may be appreciated by reference to the detailed showing of air outlet position 16 embodied in FIGURES 2, 3 and 4 of the drawing.

Panel assembly 10 includes a conventional rigid sheet metal structural panel 26 that may, if desired, be integral with instrument panel 12. Panel 26 is contoured and has a leading surface 27 facing and projecting into the vehicle passenger compartment. Panel surface 27 has secured thereto, as by an adhesive, energy absorbing padding 28 such as urethane foam. Panel 26 and padding 28 are covered by a decorative outer covering 30 fabricated from such material as stiffened vinyl or other synthetics.

As best may be seen from FIGURE 3, outer covering 30 is spaced from a portion of padding 28 such that these two elements define an air conduit 32 therebetween. Conduit 32 extends substantially along the entire length of surface 27 of panel 26. At air outlet position 16, as well as at the other air outlet positions, a plurality of air discharge orifices or slot 34 are formed through outer covering 30. Slots 34 permit air flow from conduit 32 to the vehicle passenger compartment.

As may be seen from FIGURE 1 of the drawings, conduit 32 is connected by an air duct 36 to air pressurizing means such as a fan 38 driven by an electric motor 40. Fan 38 and motor 40 constitute the air pressurizing means of the vehicle climate control system and are in communication with air heating and/or cooling means not illustrated.

A valve channel 42 having a configuration conforming with the inner configuration of outer covering 30 is slidably positioned within conduit 32 and has formed therethrough a plurality of air discharge openings 44. Openings 44 are shaped and spaced in conformity with discharge slots 34. Channel 42 carries at its ends pivot struts 46 and 48 secured to the arms of channel 42 and extending therebetween. A plurality of spaced apart baffle plates 49 are positioned between struts 46 and 48 and are pivotally secured to these struts. The edges of plates 49 proximate the passenger compartment are secured to an actuating element 50 having a length approximately half the height of the outer wall of conduit 32.

A manually operable valve actuating tab 50 is secured to and extends from element 50 through aperture 54 formed in channel 52 and aperture 56 formed through outer covering 30. It readily may be appreciated that horizontal movement of tab 52 as indicated by the arrow 58 of FIGURE 2 will cause a sliding movement of channel 42 within conduit 32. This movement of channel 42 will bring apertures 44 into and out of registry with apertures 34, thus controlling the volume of air passing from conduit 32 into the passenger compartment. Movement of tab 52 vertically as represented by the arrow 60 of FIGURE 3 will cause a corresponding vertical movement of actuating element 30 and a pivotal movement of baffle plates 49 from the position illustrated in solid to the phantom position, thereby controlling the direction of air flow through apertures 44 and 34.

Channel 42, element 50, struts 46 and 48 and baffle plates 49 are constructed from material having an extremely low resistance to deformation. Thus, when dashpanel assembly 10 is impacted, as during a vehicle crash, these elements readily will deform and their presence thus does not impair the energy absorbing capabilities of padding 28 or the crash impact characteristics of dashpanel assembly 10.

It is to be understood that any number of air discharge positions may be formed in dashpanel assembly 10. The number of discharge positions is dictated by the heating and cooling characteristics of the motor vehicle climate control system association therewith. A sufficient number of air discharge positions should be formed such that temperature equalization within the vehicle passenger compartment is obtained.

It thus may be seen that his invention provides an energy absorbing vehicle crash pad assembly through which extends an air conduit for the transmittal of air from the vehicle climate control system to the passenger compartment. The dashpanel assembly of this invention provides for temperature equalization within the passenger compartment and eliminates the need for extensive duct work for the transmittal of climate controlling air.

We claim:
1. A dashpanel assembly partially defining a motor vehicle passenger compartment, said assembly including an elongated rigid panel, resilient crash padding extending over at least a portion of the surface of said panel proximate said compartment, a decorative outer covering overlying the surface of said padding remote from said panel, said covering being spaced from at least a portion of said padding, said padding and said covering thereby cooperating to define an air conduit therebetween extending along said panel assembly, said conduit being in communication with a source of pressurized air, said covering having at least one aperture formed therethrough permitting air flow from said conduit to said passenger compartment.

2. The dashpanel assembly of claim 1, wherein a plurality of apertures are formed through said outer covering and wherein groups of said apertures are spaced along the length of said assembly.

3. The dashpanel assembly of claim 1, including valve means located within said conduit and operable to control the volume of air flowing through said aperture.

4. The dashpanel assembly of claim 3, wherein said valve means comprises a valve member positioned for sliding movement within said conduit and having a control member extending therefrom through said outer covering and into said passenger compartment.

5. The dashpanel assembly of claim 4, including manually adjustable air deflection means movable within said conduit to vary the direction of the flow of air passing through said aperture.

References Cited
UNITED STATES PATENTS

| | | | |
|---|---|---|---|
| 2,818,933 | 1/1958 | Tell | 180—90 |
| 3,130,807 | 4/1964 | McHenry | 180—90 |
| 3,366,026 | 1/1968 | Herr et al. | 98—2 |

BENJAMIN HERSH, Primary Examiner

JOHN A. PEKAR, Assistant Examiner

U.S. Cl. X.R.

296—70